US 10,496,921 B2

(12) United States Patent
Tan et al.

(10) Patent No.: US 10,496,921 B2
(45) Date of Patent: Dec. 3, 2019

(54) NEURAL NETWORK MAPPING DICTIONARY GENERATION

(71) Applicant: FUJITSU LIMITED, Kawasaki-shi, Kanagawa (JP)

(72) Inventors: Xuan Tan, Sunnyvale, CA (US); Nikola Nedovic, San Jose, CA (US)

(73) Assignee: FUJITSU LIMITED, Kawasaki (JP)

(*) Notice: Subject to any disclaimer, the term of this patent is extended or adjusted under 35 U.S.C. 154(b) by 851 days.

(21) Appl. No.: 15/145,664

(22) Filed: May 3, 2016

(65) Prior Publication Data

US 2017/0323198 A1 Nov. 9, 2017

(51) Int. Cl.
G06N 3/08 (2006.01)
G06N 3/04 (2006.01)
H04L 29/12 (2006.01)
G06N 3/02 (2006.01)

(52) U.S. Cl.
CPC .............. G06N 3/08 (2013.01); G06N 3/04 (2013.01); H04L 61/103 (2013.01); G06N 3/02 (2013.01)

(58) Field of Classification Search
None
See application file for complete search history.

(56) References Cited

U.S. PATENT DOCUMENTS 7,353,218 B2  4/2008  Aggarwal et al.

OTHER PUBLICATIONS

Brassai, et al., Hardware Implementation of CMAC Type Neural Network on FPGA for Command Surface Approximation, Acta Polytechnica Hungarica, vol. 4, No. 3 (2007) pp. 5-16 (Year: 2007).*
Adam Coates et. al., "Learning Feature Representations with K-means", Neural Networks: Tricks of the Trades, 2012.
Harry Gifford, "Hierarchical k-Means for Unsupervised Learning", Carnegie Mellon University, Accessed on May 3, 2016.
Edo Liberty et. al., "An algorithm for Online K-Means Clustering", 2015.
Nir Ailon, "Streaming k-means approximation", 2009.
Qiang Du et. al., "Centroidal Voronoi Tessellations: Applications and Algorithm", 1999.
Wikipedia, "Lloyd's Algorithms" https://en.wikipedia.org/wiki/Lloyd%27s_algorithm, accessed May 3, 2016.

* cited by examiner

Primary Examiner — Wilbert L Starks
(74) Attorney, Agent, or Firm — Maschoff Brennan

(57) ABSTRACT

A method of generating mapping dictionaries for neural networks may be provided. A method may include receiving, at a current layer, encoded activation addresses from a previous layer and encoded weight addresses. The method may also include decoding the encoded activation addresses to generate decoded activation addresses, and decoding the encoded weight addresses to generate decoded weight addresses. Further, the method may include generating original activation addresses from the decoded activation addresses and the decoded weight addresses. Moreover, the method may include matching the original activation addresses to a mapping dictionary to generate encoded activation addresses for the current layer.

20 Claims, 4 Drawing Sheets

NEURAL NETWORK MAPPING DICTIONARY GENERATION

FIELD

The embodiments discussed herein relate to generating mapping dictionaries for neural networks.

BACKGROUND

Neural network analysis may include models of analysis inspired by biological neural networks attempting to model high-level abstractions through multiple processing layers. However, neural network analysis may consume large amounts of computing and/or network resources.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include methods of generating mapping dictionaries for a neural network. According to one embodiment, a method may include receiving, at a current layer, encoded activation addresses from a previous layer and encoded weight addresses. The method may also include decoding the encoded activation addresses to generate decoded activation addresses. Further, the method may include decoding the encoded weight addresses to generate decoded weight addresses. In addition, the method may include generating original activation addresses from the decoded activation addresses and the decoded weight addresses. Moreover, the method may include matching the original activation addresses to a mapping dictionary to generate encoded activation addresses for the current layer.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
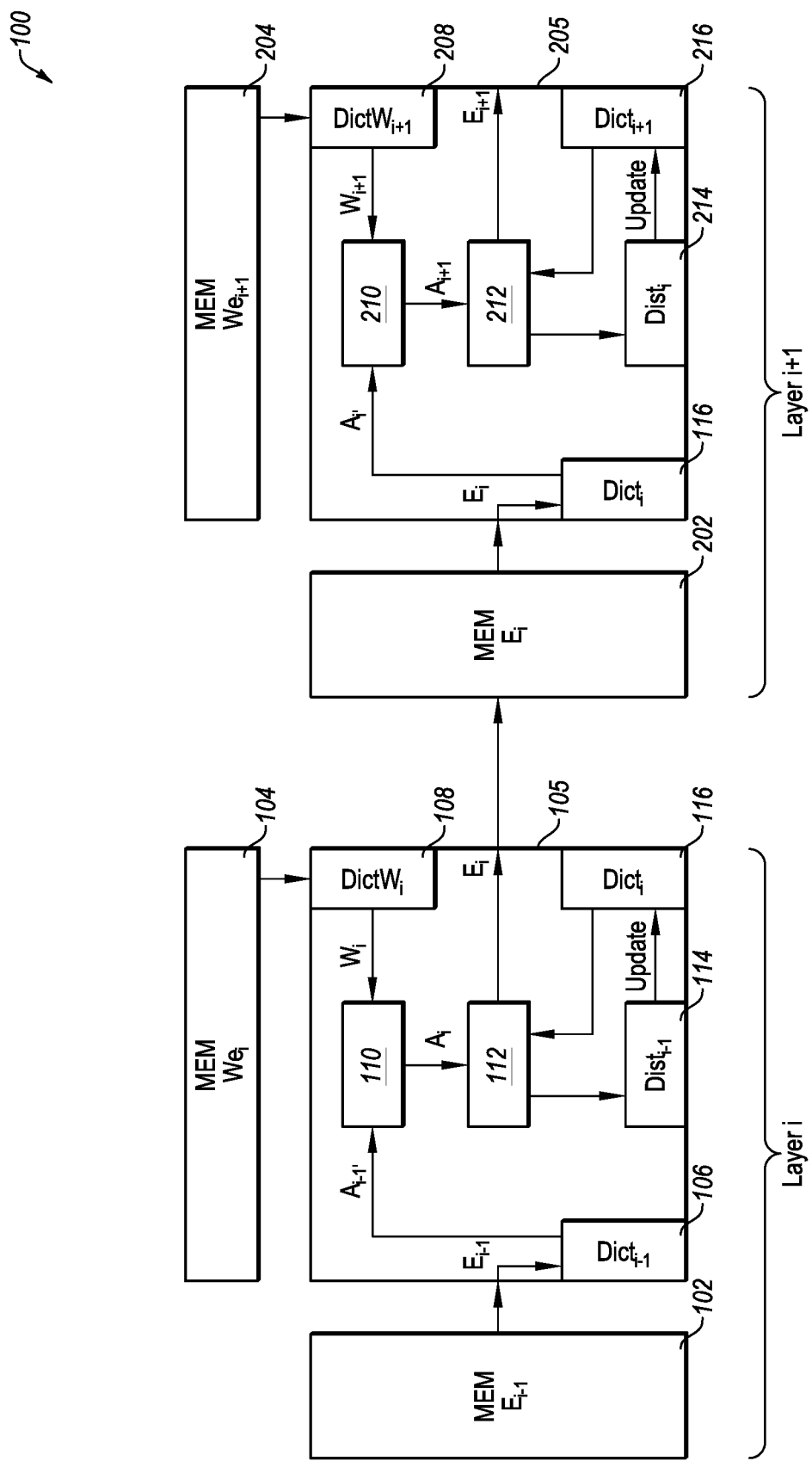
FIG. 1 illustrates a deep learning system, according to an embodiment of the present disclosure.

Neural network analysis may include receiving inputs for analysis and passing those inputs through one or more intermediate layers to perform data structure analyses (e.g., analyses on a data structure). The outputs of the data structure analysis of one layer may be passed to an adjacent layer to perform an additional data structure analysis, and so on until the entire neural network analysis is completed and a result is outputted. Such a neural network analysis may be resource intensive, both in storing all of the inputs and outputs of the intermediate layers and in transmitting data between the intermediate layers.

Deep learning (DL), which may also be referred to as "deep machine learning," "deep structured learning," or "hierarchical learning" is a branch of machine learning based on a set of algorithms that attempt to model high-level abstractions in data by using model architecture.

Because the dimensionality of data is extremely high in practical DL applications, architectures may require large networks with high complexity and sufficient time for training. To reduce the size of architectures and achieve efficient training, conventionally, it may be necessary to apply an unsupervised clustering method to inputs (e.g., intermediate activations and weights). Thus, benefits may include reduction of communication bandwidth/memory capacity requirements and easiness of hardware implementation.

Conventional data distribution inspecting methods (e.g. offline K-means implemented by Lloyd's Algorithm) have been employed to generate mapping dictionaries. These methods have proven to be time-consuming and hardware-unfriendly. Further, generating optimal dictionaries by employing convention clustering methods (e.g., Lloyd's K-means Algorithm) is difficult because conventional algorithms require large amounts of data and resources.

The present disclosure relates to efficiently generating mapping dictionaries. Some embodiments include methods (e.g., adaptive, online methods) for generating mapping dictionaries, which may be used for encoding intermediate activations and weights in each layer automatically. According to some embodiments, mapping dictionaries may be generated layer by layer, sequentially, via, for example, inspecting, clustering intermediate activations, and updating mapping dictionaries for each iteration. Embodiments of the present disclosure may be easily implemented, may be hardware-friendly, and may be computationally efficient, and therefore, achieve memory/communication requirements related to mobile and embedded devices. Embodiments described herein be utilized with various DL techniques, such as, for example only, convolutional neural networks, recurrent neural network, long short term memory (LSTM), and the like.

Mapping of neural networks may include two different types of dictionaries, one type of dictionary for intermediate activations, and another type of dictionary for weights. Dictionaries for intermediate activations may be generated according to one or more embodiments disclosed herein. Weights dictionaries may be generated by offline K-means (e.g., Lloyd's algorithms).

As used in the present disclosure, a "dictionary" may include any computer-readable data that includes one or more "entries" to associate one item with another. For example, a dictionary entry may associate a simple electronic message (e.g., a five bit value) with a more complex data structure (e.g., a thirty-two bit floating value). A dictionary may be queried by one of the entries (e.g., the simple electronic message) and receive as an output the correlated entry. For example, a query by a simple electronic message may result in the output of a more complex data structure and a query by a more complex data structure may result in the output of a simple electronic message.

FIG. 1 depicts one embodiment of a portion of a deep learning system 100. More specifically, FIG. 1 depicts two layers Layer i and Layer i+1 of deep learning system 100.

Layer i includes memory 102, which may include encoded activation addresses "$E_{i-1}$" generated in a Layer i−1 (not show in FIG. 1), and a memory 104 that may include encoded weights addresses "$We_i$" generated in Layer i. In addition, system 100 includes processing element 105. System 100 further includes dictionary "$Dict_{i-1}$" 106, dictionary "Dict $w_i$" 108, computing device 110, matching unit 112, distance calculation unit "$Dist_{i-1}$" 114, and dictionary "$Dict_i$" 116.

Layer i+1 includes memory 202, which may include encoded activation addresses "$E_i$", and a memory 204 that may include encoded weights addresses "$We_{i+1}$". In addition, system 100 includes processing element 205. System 100 further includes dictionary "Dict $w_{i+1}$" 208, computing device 210, matching unit 212, distance calculation unit "$Dist_i$" 214, and dictionary "$Dict_{i+1}$" 216.

Dictionary "$Dict_i$" 116 may comprise a pre-trained mapping dictionary (e.g., for activations), which may be shared between adjacent layers (e.g., $i^{th}$ and $(i+1)^{th}$ layers). Dictionary "$Dict_i$" 116 may include a plurality of (e.g., up to 64) 32-bit floating numbers. Dictionary "Dict $w_i$" 108 may include a pre-trained mapping dictionary (e.g., for weights), and may include a plurality of (e.g., up to 64) 32-bit floating numbers.

During a contemplated "inference mode" operation of system 100, dictionary "$Dict_i$" 116 & dictionary "Dict $w_i$" 108 may be generated for each layer, and dictionary "$Dict_i$" 116 may be shared between adjacent layers (e.g., Layers i and i+1).

Dictionary "$Dict_{i-1}$" 106 may receive encoded activation addresses "$E_{i-1}$", and dictionary "Dict $w_i$" 108 may receive encoded weights addresses "$We_i$". Dictionary "$Dict_{i-1}$" 106 may decode encoded activation addresses "$E_{i-1}$" into decoded activations "$A'_{i-1}$", and dictionary "Dict $w_i$" 108 may decode encoded weights "$We_i$" into decoded weighted addresses "$W_i$". Decoded activations "$A'_{i-1}$" may include, for example, 32-bit floating values generated by mapping addresses to a dictionary.

Decoded activations $A'_{i-1}$" and decoded weights "$W_i$" may be received by computing device 110 for deep learning computing. An output "$A_i$" (e.g., original activations which are 32-bit floating values in $i^{th}$ layer) of computing device 110 may be encoded as encoded activation address "$E_i$" by matching it to dictionary "$Dict_i$" 116 via matching unit 112. Further, as described more fully below, according to a distance determined via distance calculation unit "$Dist_{i-1}$" (e.g., a distance to selected dictionary centroids for dictionary updating), dictionary "$Dict_i$" 116 may be updated. Encoded activation address "$E_i$" may be transmitted by matching unit 112 and stored into memory block 202 of the next layer (e.g., Layer i+1).

Further, dictionary "$Dict_i$" 116 may receive encoded activation addresses "$E_i$", and dictionary "Dict $w_{i+1}$" 208 may receive encoded weights addresses "$We_{i+1}$". Dictionary "$Dict_i$" 116 may decode encoded activation addresses "$E_i$" into decoded activations "A'i", and dictionary "Dict $w_{i+1}$" 208 may decode encoded weights "$We_{i+1}$" into decoded weighted addresses "$W_{i+1}$". Decoded activations "$A'_i$" may include, for example, 32-bit floating values generated by mapping addresses to a dictionary.

Decoded activations "$A'_i$" and decoded weights "$W_{i+1}$" may be received by computing device 210 for deep learning computing. An output "$A_{i+1}$" (e.g., original activations which are 32-bit floating values in $i^{th}$ layer) of computing device 210 may be encoded as encoded activation address "$E_{i+1}$" by matching it to dictionary "$Dict_{i+1}$" 216 via matching unit 212. Further, as described more fully below, according to a distance determined via distance calculation unit "$Dist_i$" 214 (e.g., a distance to selected dictionary centroids for dictionary updating), dictionary "$Dict_{i+1}$" 216 may be updated. Encoded activation address "$E_{i+1}$" may be transmitted by matching unit 212 and stored into a memory block 202 of a next layer (e.g., Layer i+2).

During a contemplated "dictionary generating" mode, all dictionaries may be initialized (e.g., uniform assigning with guessing range and number of bits). For example, if the decided range is from −2 to 1, and the pre-decided number of centroids is 5, the initial dictionary may be [−2, −1.4, −0.8, −0.2, 0.4], and the distances between adjacent centroids are all the same. Further, in one example, activation dictionary, Dict, may be initialized in a random fashion (e.g., via assigning random numbers at scale of 1e-3 with variance of 1). In another embodiment, another a pre-trained dictionary may be used for initialization. Further, for example, with epoch e=1, Layer i=1, and iteration j=1, the following acts may be performed: 1) forward computing to layer i with data batch j; 2) collect corresponding intermediate activations for layer i; 3) calculate an average distance between each original activation address to the closest dictionary entry in each cluster; 4) update a dictionary based on the calculated average distances and an update ("learning") rate; and 5) reduce the update rate. Further, the whole dataset may be shuffled.

Figure 2:
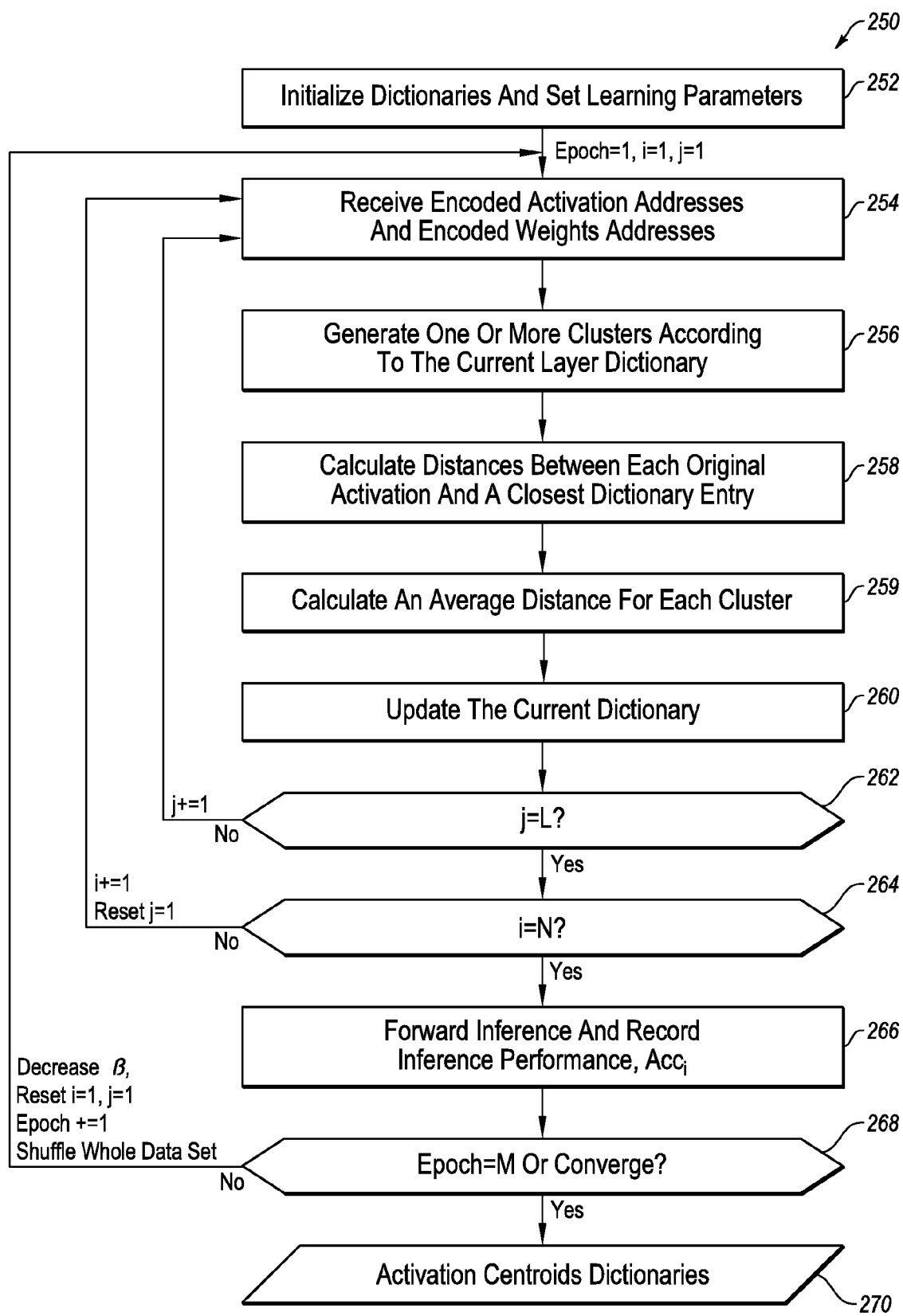
FIG. 2 is a flowchart of an example method for generating mapping dictionaries for deep learning systems.

FIG. 2 is a flowchart of an example method 250 for generating mapping dictionaries, in accordance with at least one embodiment of the present disclosure. Method 250 may be performed by any suitable system, apparatus, or device. For example, system 100 of FIG. 1 or one or more of the components thereof may perform one or more of the operations associated with method 250. In these and other embodiments, program instructions stored on a computer readable medium may be executed to perform one or more of the operations of method 250.

At block 252, one or more dictionaries may be initialized, and learning parameters may be set. For example, with reference to FIG. 1, one or more of dictionaries 106, 108, 116, 208 and 206 may be initialized. More specifically, as an example, activation dictionary, Dict, may be initialized in a random fashion (e.g., via assigning random numbers at scale of 1e-3 with variance of 1). In another embodiment, another a pre-trained dictionary may be used for initialization. Further, for example, a learning rate β, a number of epochs M, a number of layers N, and a number of iterations L may be set.

At block 254, encoded activation addresses and encoded weights addresses may be received. The encoded activation addresses and encoded weights addresses may be decoded, and original activations may be generated (e.g., via deep learning computing) based on the decoded activation addresses and decoded weights addresses, and method 200 may proceed to block 256.

At block 256, according to current layer dictionary (e.g., dictionary $Dict_i$), one or more clusters may be generated, and method 200 may proceed to block 258. For example, each entry of the current layer dictionary linked to a received original activation (e.g., each original activation is linked a dictionary entry that is closest in value to the original activation). A cluster may include one or more received original activations linked to a common dictionary entry.

At block 258, distances between each original activation and a closest dictionary entry (e.g., its "linked" dictionary entry) may be calculated, and method 200 may proceed to block 259.

At block 259, an average distance for each cluster may be calculated, and method 200 may proceed to block 260.

At block 260, the current dictionary (e.g., dictionary Dict) may be updated, and method 200 may proceed to block 262. For example, the current dictionary may be updated based on the average distance, and possibly, a learning rate (e.g., $Dict_i(t_0+1)=Dict_i(t_0)+\beta Dist_i$). It is noted that other variants of order of execution or update equations may also be suitable, such as updating dictionary entries based on a sign of the calculated distance.

At block 262, a determination may be made as to whether batch j=L. If it is determined that j=L, method 250 may proceed to block 264. If it is determined that j !=L, j+=1, and method 250 may return to block 254.

At block 264, a determination may be made as to whether current layer i=N. If it is determined that i=N, method 250 may proceed to block 266. If it is determined that i !=N, i+=1, reset j=1, and method 250 may return to block 254.

At block 266, forward inference and record inference performance may be determined, and method 250 may proceed to block 268. "Forward inference" includes forward computing (e.g., by starting from first layer to the last layer). At the end of a network, a degree of accuracy may be determined. If the accuracy is above a threshold, the learning process may cease.

At block 268, a determination may be made as to whether Epoch=M or convergence exists. If it is determined that Epoch=M or there is convergence (e.g., the activations dictionary is not substantially changing), method 250 may proceed to block 270. If it is determined that Epoch!=M and no convergence, Epoch=1, i=1, j=1, and method 250 may return to block 254.

At block 270, one or more activation centroid dictionaries may be utilized. For example, an activation centroid dictionary is collection of floating-point numbers (e.g., layer1→[0.02, 0.3, 1.2, 5.6], layer2→[6.3, 0.2, 9.9, 4.5], etc.). The number of dictionaries may be equal to the number of layers of the neural network. The dictionaries may be for intermediate activations only, not including weights.

It is noted that, for example, in a three-layer architecture, a method may include forward computing to a first-layer and collecting intermediate activations of the first-layer. Subsequently, the method may include forward computing to a second layer (e.g., after the first-layer), and collecting intermediate activations of the second-layer. Thereafter, the method may include forward computing to a third-layer and collecting intermediate activations of the third layer (e.g., after the first and second layers).

Modifications, additions, or omissions may be made to method 250 without departing from the scope of the present disclosure. For example, the operations of method 250 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 3:
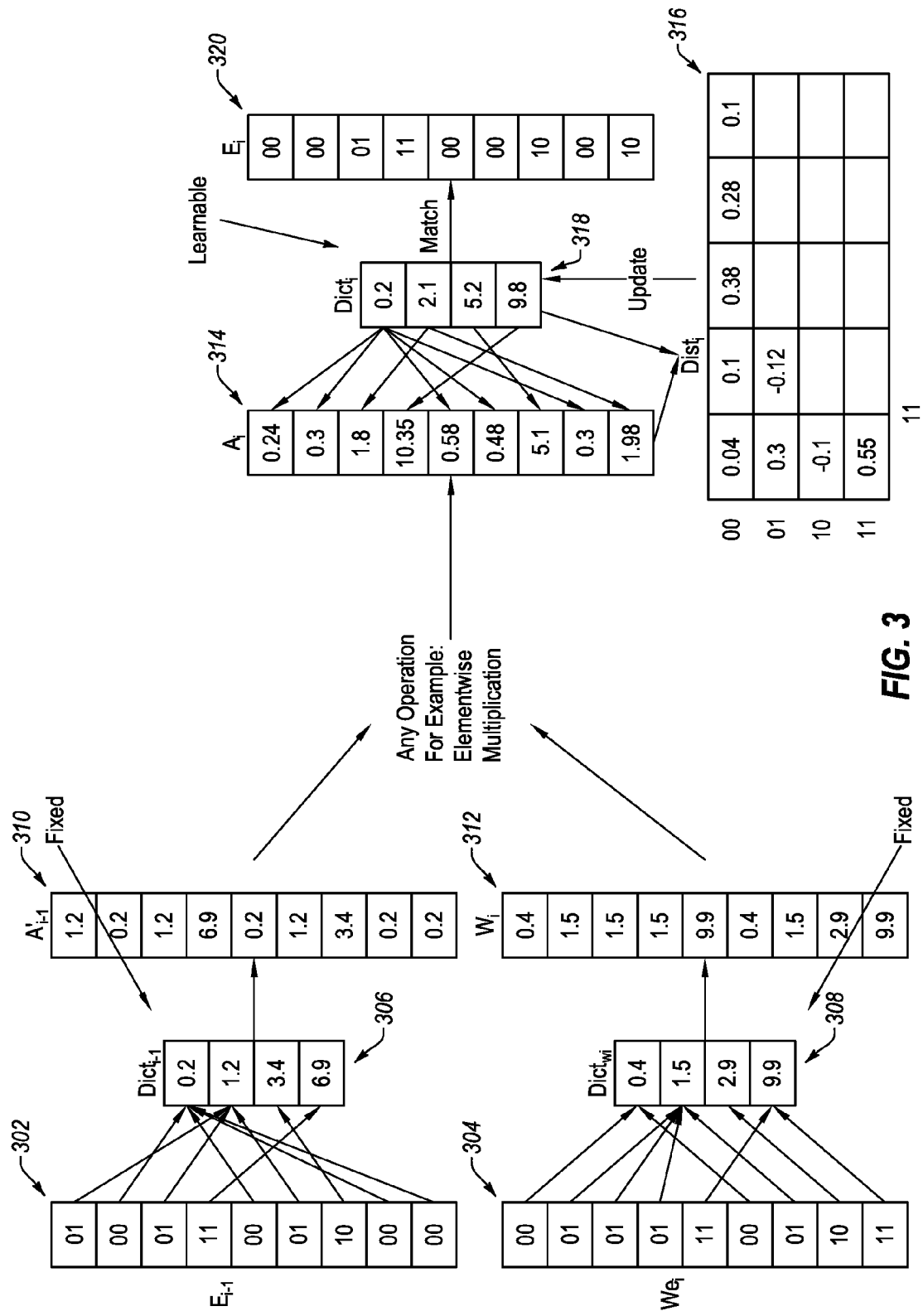
FIG. 3 depicts an example of generating a dictionary in a layer of a deep learning system.

FIG. 3 depicts an example of generating a dictionary in a layer (e.g., Layer i; see FIG. 1). FIG. 3 illustrates encoded activation addresses "$E_{i-1}$" 302, encoded weight addresses "$We_i$" 304, dictionary "$Dict_{i-1}$" 306, dictionary "$Dict_{wi}$" 308, decoded activations "$A'_{i-1}$" 310, decoded weight addresses "$W_i$" 312, original activations "$A_i$" 314, distance matrix "$Dist_i$" 316, dictionary "$Dict_i$" 318, and encoded activation addresses "$E_i$" 320.

During a contemplated operation, encoded activation addresses 302 may be decoded into decoded activations "$A'_{i-1}$" 310 by dictionary "$Dict_{i-1}$" 306. Further, encoded weight addresses "$We_i$" 304 may be decoded into decoded weight addresses "$W_i$" 312 by dictionary "$Dict_{wi}$" 308. In addition, decoded activations "$A'_{i-1}$" 310 and decoded weight addresses "$W_i$" 312 may be used to generate original activations "$A_i$" 314, which may be encoded into encoded activation addresses "$E_i$" 320 via matching to dictionary "$Dict_i$" 318.

Moreover, distances between each original activation and the nearest entry of dictionary "$Dict_i$" 318 may be determined. With reference to distance matrix "$Dist_i$" 316, a first cluster "00" includes distance values for the first entry in dictionary "$Dict_i$" 318 ("0.2") at each associated activation "$A_i$" 314. More specifically, for example, with regard to cluster "00", a distance between 0.24 and 0.2=0.04, a distance between 0.3 and 0.2=0.1, a distance between 0.58 and 0.2=0.38, a distance between 0.48 and 0.2=0.28, and a distance between 0.3 and 0.2=0.1. In this example, an average distance=0.18. Therefore, the first entry in dictionary "$Dia_i$" 318 ("0.2"), may be adjusted by 0.18, to 0.38.

In addition, dictionary "$Dict_i$" 318 may be updated based on the distance matrix "$Dist_i$" 316. More specifically, for example, an entry in dictionary "$Dict_i$" 318 may be updated based on an average distance between the entry and each associated activation in a cluster.

Figure 4:
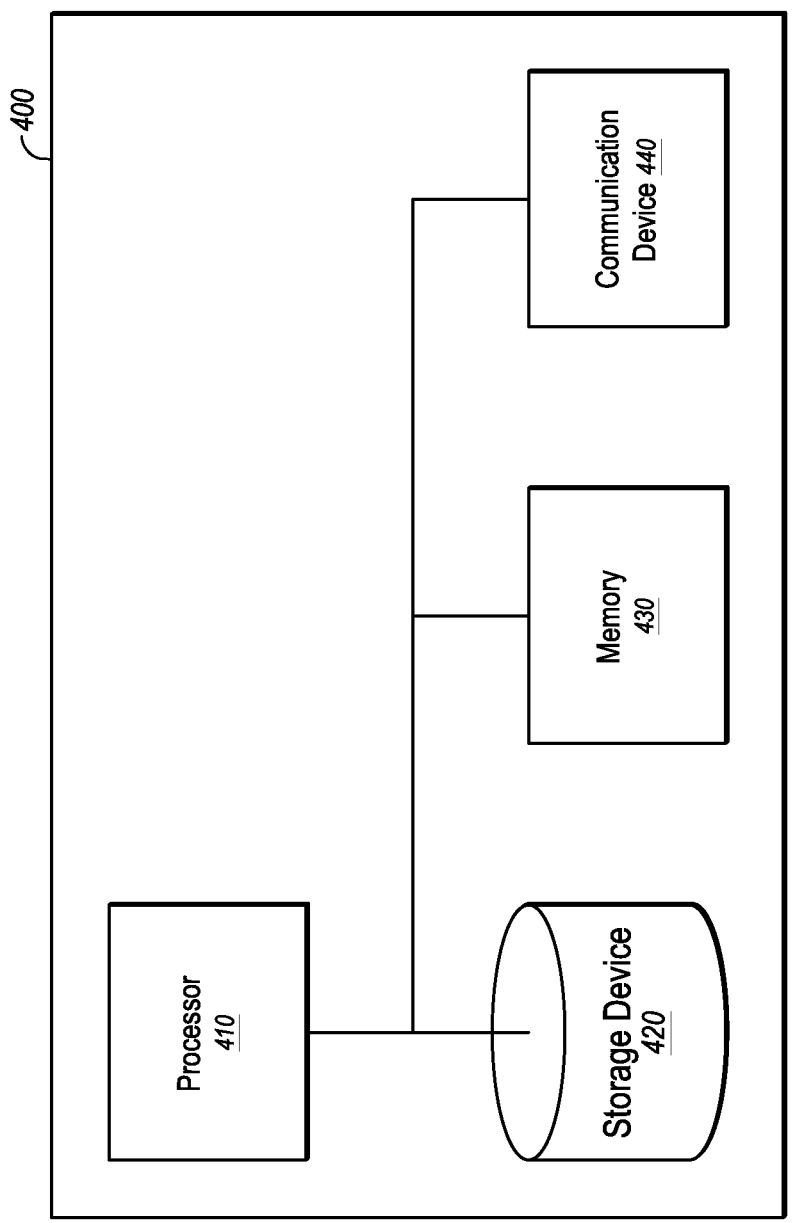
FIG. 4 is a block diagram of an example computing device.

FIG. 4 is a block diagram of an example computing device 400, in accordance with at least one embodiment of the present disclosure. For example, system 100 of FIG. 1 may be implemented as computing device 400. Computing device 400 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 400 may include a processor 410, a storage device 420, a memory 430, and a communication component 440. Processor 410, storage device 420, memory 430, and/or communication component 440 may all be communicatively coupled such that each of the components may communicate with the other components. Computing device 400 may perform any of the operations described in the present disclosure.

In general, processor 410 may include any suitable special-purpose or general-purpose computer, computing entity, or processing device including various computer hardware or software modules and may be configured to execute instructions stored on any applicable computer-readable storage media. For example, processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, processor 410 may include any number of processors configured to perform, individually or collectively, any number of operations described in the present disclosure.

In some embodiments, processor 410 may interpret and/or execute program instructions and/or process data stored in storage device 420, memory 430, or storage device 420 and memory 430. In some embodiments, processor 410 may fetch program instructions from storage device 420 and load the program instructions in memory 430. After the program instructions are loaded into memory 430, processor 410 may execute the program instructions.

For example, in some embodiments one or more of the processing operations of a process chain may be included in data storage 420 as program instructions. Processor 410 may fetch the program instructions of one or more of the processing operations and may load the program instructions of the processing operations in memory 430. After the program instructions of the processing operations are loaded into memory 430, processor 410 may execute the program instructions such that computing device 400 may implement the operations associated with the processing operations as directed by the program instructions.

Storage device 420 and memory 430 may include computer-readable storage media for carrying or having computer-executable instructions or data structures stored thereon. Such computer-readable storage media may include any available media that may be accessed by a general-purpose or special-purpose computer, such as processor 410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

In some embodiments, storage device 420 and/or memory 430 may store data associated with a deep learning system. For example, storage device 420 and/or memory 430 may store encoded activation addresses, encoded weight addresses, and/or one or more dictionaries.

Communication component 440 may include any device, system, component, or collection of components configured to allow or facilitate communication between computing device 400 and another electronic device. For example, communication component 440 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication component 440 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 4 without departing from the scope of the present disclosure. For example, computing device 400 may include more or fewer elements than those illustrated and described in the present disclosure. For example, computing device 400 may include an integrated display device such as a screen of a tablet or mobile phone or may include an external monitor, a projector, a television, or other suitable display device that may be separate from and communicatively coupled to computing device 400.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of generating mapping dictionaries for a neural network, comprising:
  receiving, at a current layer, encoded activation addresses from a previous layer and encoded weight addresses;
  decoding the encoded activation addresses to generate decoded activation addresses;
  decoding the encoded weight addresses to generate decoded weight addresses;
  generating original activation addresses from the decoded activation addresses and the decoded weight addresses; and
  matching the original activation addresses to a mapping dictionary to generate encoded activation addresses for the current layer.

2. The method of claim 1, further comprising:
  assigning each original activation address to a closest dictionary entry in the mapping dictionary to generate one or more clusters, wherein a cluster comprises one or more original activation address assigned to a common dictionary entry;
  calculating an average distance between each original activation address and the closest dictionary entry in each cluster; and
  updating the mapping dictionary according to the average distance calculations.

3. The method of claim 2, wherein updating the mapping dictionary comprises updating each dictionary entry according to the average distance of an associated cluster and a learning rate.

4. The method of claim 3, further comprising reducing the learning rate.

5. The method of claim 1, wherein generating original activation addresses comprises generating 32-bit floating values.

6. The method of claim 1, wherein decoding the encoded activation addresses comprises decoding 32-bit floating values.

7. The method of claim 1, wherein matching the original activation addresses to a mapping dictionary comprises matching the original activation addresses to the mapping dictionary shared between the current layer and a next layer.

8. The method of claim 1, wherein matching the original activation addresses to a mapping dictionary comprises matching the original activation addresses to the mapping dictionary comprising a plurality of 32-bit floating values.

9. The method of claim 1, further comprising transmitting the encoded activation addresses to a next layer.

10. One or more non-transitory computer-readable media that include instructions that, when executed by one or more processors, are configured to cause the one or more processors to perform operations, the operations comprising:
  receiving, at a current layer, encoded activation addresses from a previous layer and encoded weight addresses;
  decoding the encoded activation addresses to generate decoded activation addresses;
  decoding the encoded weight addresses to generate decoded weight addresses;
  generating original activation addresses from the decoded activation addresses and the decoded weight addresses; and
  matching the original activation addresses to a mapping dictionary to generate encoded activation addresses for the current layer.

11. The computer-readable media of claim 10, the operations further comprising:
  assigning each original activation address to a closest dictionary entry in the mapping dictionary to generate one or more clusters, wherein a cluster comprises one or more original activation addresses assigned to a common dictionary entry;
  calculating an average distance between each original activation address and the closest dictionary entry in each cluster; and
  updating the mapping dictionary according to the average distance calculations.

12. The computer-readable media of claim 11, wherein updating the mapping dictionary comprises updating each dictionary entry according to the average distance of an associated cluster and a learning rate.

13. The computer-readable media of claim 12, the operations further comprising reducing the learning rate.

14. The computer-readable media of claim 10, wherein matching the original activation addresses to a mapping dictionary comprises matching the original activation addresses to the mapping dictionary shared between the current layer and a next layer.

15. The computer-readable media of claim 10, the operations further comprising transmitting the encoded activation addresses to a next layer.

16. A system for generating mapping dictionaries for a neural network, comprising:
  a plurality of layers, each layer of the plurality of layers including at least one storage device and a processing element, each processing element configured to:
    decode encoded activation addresses to generate decoded activation addresses;
    decode encoded weight addresses to generate decoded weight addresses;
    generate original activation addresses from the decoded activation addresses and the decoded weight addresses; and
    match the original activation addresses to a mapping dictionary to generate encoded activation addresses for the layer.

17. The system of claim 16, each processing element further configured to:
  assign each original activation address to a closest dictionary entry in the mapping dictionary to generate one or more clusters, wherein a cluster comprises one or more original activation addresses assigned to a common dictionary entry;
  calculate an average distance between each original activation address and the closest dictionary entry in each cluster; and
  update the mapping dictionary according to the average distance calculations.

18. The system of claim 16, wherein each processing element is configured to update each dictionary entry according to the average distance of an associated cluster.

19. The system of claim 16, each processing element further configured to transmit the encoded activation addresses to a next layer.

20. The system of claim 16, wherein the neural network includes at least one of a convolutional neural network, a recurrent neural network, and a long short term memory (LSTM) neural network.

* * * * *